Jan. 20, 1959    H. A. KRUEGER    2,869,592
MEASURING AND DISPENSER DEVICE
Filed Dec. 15, 1955    2 Sheets-Sheet 1
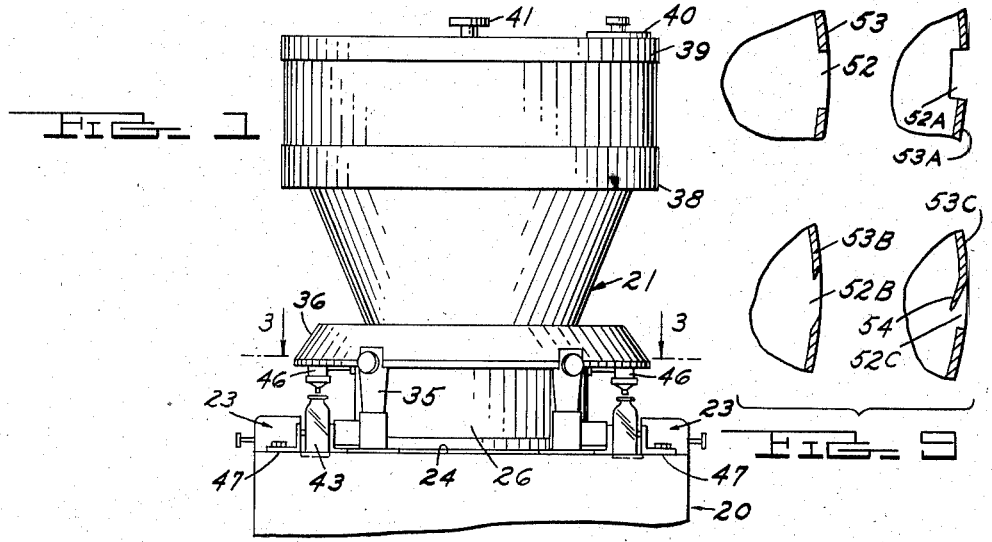
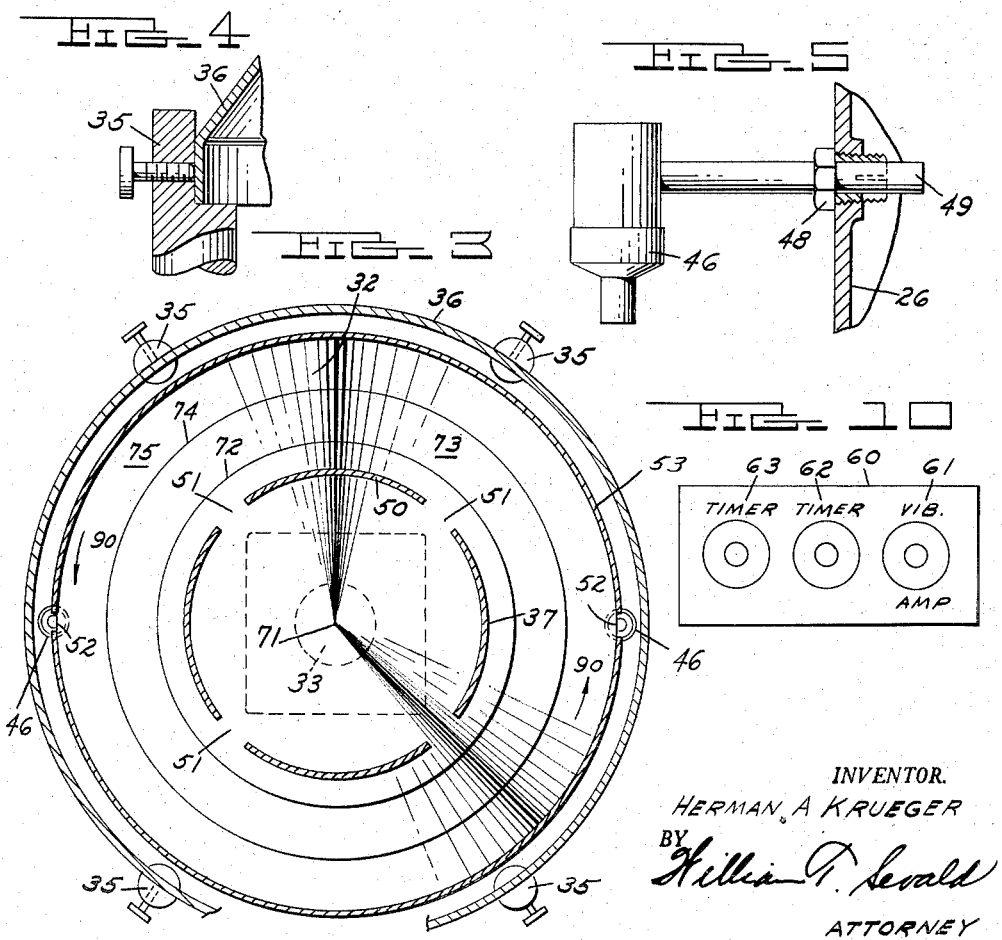
INVENTOR.
HERMAN A. KRUEGER
BY
ATTORNEY Jan. 20, 1959     H. A. KRUEGER     2,869,592
MEASURING AND DISPENSER DEVICE
Filed Dec. 15, 1955     2 Sheets-Sheet 2
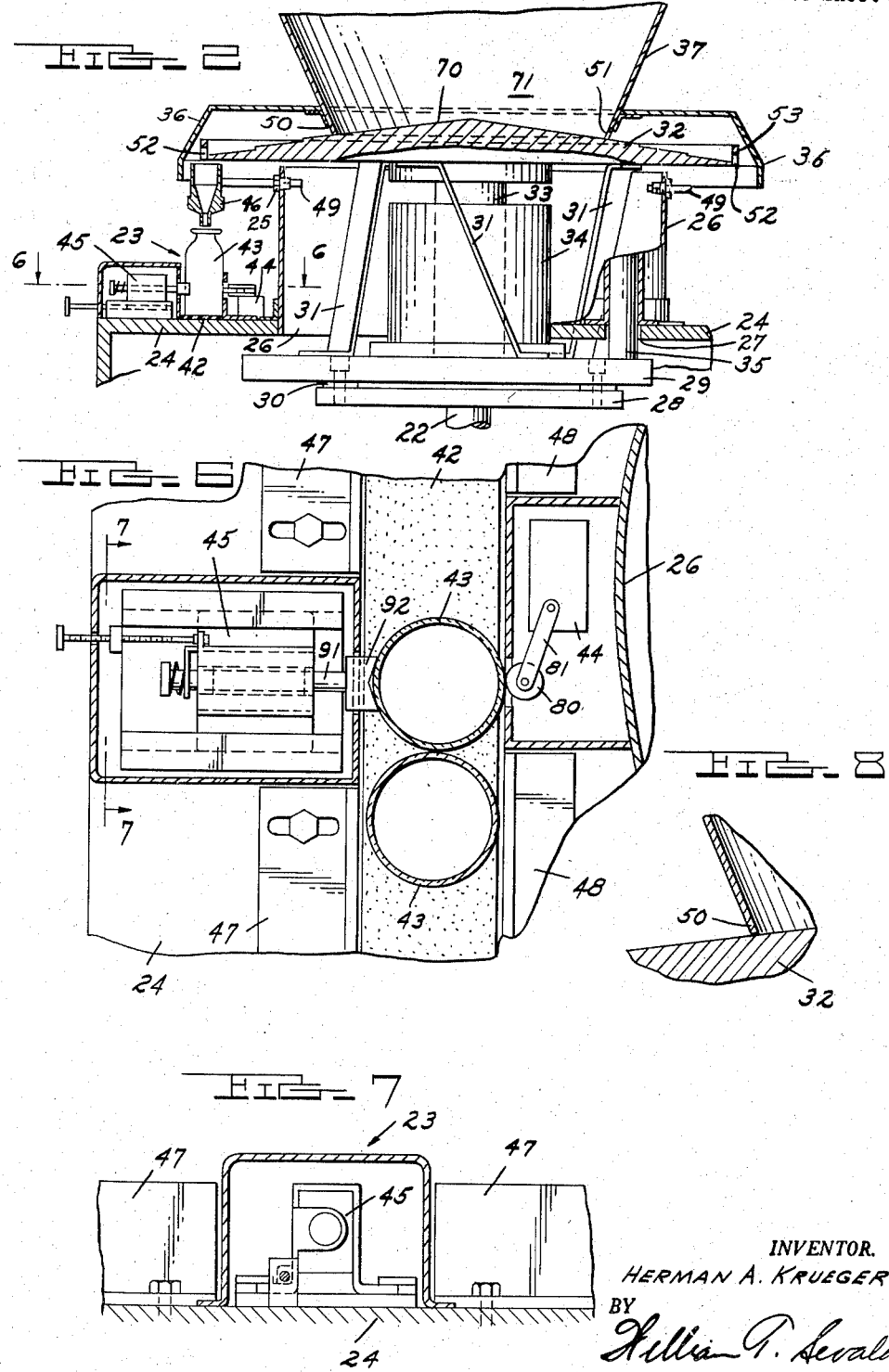
INVENTOR.
HERMAN A. KRUEGER
BY
ATTORNEY

2,869,592
MEASURING AND DISPENSER DEVICE

Herman A. Krueger, Detroit, Mich.

Application December 15, 1955, Serial No. 553,219

14 Claims. (Cl. 141—160)

This invention relates to an accurate aggregate measuring device or dry powder filling machine capable of dispensing accurate amounts and more particularly pertains to a vibratory mechanism for dispensing aggregate accurately as controlled by the amplitude of the vibrations and the time interval during which the vibrations occur.

Various measuring and dispensing devices have been used for accurately measuring and dispensing small amounts of aggregate such as expensive drug powders that are used in small quantities, however, the devices of the prior art have not proven entirely satisfactory inasmuch as they are complicated in design and construction, expensive to manufacture, and difficult to use in continuous operation and slow in action.

With the foregoing in view, the primary object of the invention is to provide a vibratory dispensing apparatus which dispenses amounts of granular material or aggregate in accurate amounts which is simple in design and construction, inexpensive to manufacture, easy to use, and easy to use continuously without inaccuracies developing in the dispensing apparatus and which is capable of quick, high production action.

An object of the invention is to provide a vibratory platen which is axially and angularly vibrated so as to cause aggregate deposited thereon to travel spirally relative to the platen.

An object of the invention is to provide a crowned portion on the platen to assist in causing the aggregate thereon to move radially.

An object of the invention is to provide a platen with stepped annular surfaces concentrically disposed outside the central crown portion of the platen to provide a leveling area for the aggregate moved thereon by the vibrations of the platen.

An object of the invention is to provide a hopper suspended above the platen having spaced apertures for permitting the aggregate in the hopper to travel outwardly of the platen.

An object of the invention is to provide an annular retaining ring around the circumference of the platen at its periphery having at least one aperture formed therein preferably between the slots or openings of the hopper for permitting the material to move off the platen into a container.

An object of the invention is to provide angularly disposed spring members supporting the platen so that when the platen is vibrated such as by an armature and coil the platen moves angularly as well as axially.

An object of the invention is to provide adjustable funnel means at the platen outlet slots for channeling the material into containers.

An object of the invention is to provide a conveyor line for moving the vials or containers below the funnel means and electrically operated means for clamping the vials in the desired position below the funnel means.

An object of the invention is to provide a limit switch for connecting the power to the vibration causing means operated by a container moving into the proper position below the funnel and means for clamping the container in a position below the funnel against the limit switch.

An object of the invention is to provide means for varying the amplitude or force of the vibrations.

An object of the invention is to provide means for determining the time during which the vibrations occur.

An object of the invention is to provide means for elevating and lowering the platen, hopper, and vibratory mechanism together with the funnel portions to accommodate various sized containers.

An object of the invention is to provide an adjustable conveyor portion to accommodate the various sized containers.

An object of the invention is to provide various types of outlet slots for the platen portion to vary the amount of material dispensed and various types of hopper outlet slots and locations of same.

These and other objects of the invention will become apparent by reference to the following description of a vibratory dispenser means which is accurate, automatic and continuous embodying the invention taken in connection with the accompanying drawings in which:

Fig. 1 is an end side elevational view of the device.

Fig. 2 is a vertical cross-sectional view of the device as seen in Fig. 1.

Fig. 3 is a cross-sectional view of Fig. 1 taken on the line 3—3 thereof.

Fig. 4 is a detail showing partly in cross-section of the hopper support means.

Fig. 5 is a detail showing, partly in cross-section of the funnel position adjusting means.

Fig. 6 is an enlarged top elevational view of the conveyer portion of the device, partly in cross-section showing the limit switch and container positioning clamping device.

Fig. 7 is a cross-sectional view of Fig. 6 taken on the line 7—7 thereof.

Fig. 8 is a fragmentary view, partly in cross-section, showing the close spaced relation of the hopper and platen.

Fig. 9 is a collective view of fragmentary showings of the platen periphery at the dispensing slots showing several modifications thereof; and Fig. 10 is a plan view of the electrical controls.

Referring now to the drawings wherein like numerals refer to like and corresponding parts throughout the several views, the accurate amount vibratory dispenser disclosed therein to illustrate the invention comprises a supporting frame portion 20 for enclosing the necessary electrical power apparatus to produce the vibrations, a platen and hopper assembly 21 disposed on the frame 20 and raisable and lowerable relative to the frame 20 via the pedestal 22 to which a suitable hydraulic or screw jack mechanism is attached and a conveyer portion 23 disposed on the frame 20 adjacent the hopper and platen assembly 21.

More particularly, the frame 20 comprises a top portion 24 for supporting the conveyer portion 23 having an opening in which the shroud 26 is disposed and four spaced openings 27 for receiving the hopper supporting posts as hereinafter more fully described. The plate 28 is mounted on the pedestal 22 and the plate 29 is secured to the plate 28 with the rubber cushions 30 disposed between the plates 28 and 29 to dampen vibration to the plate 28 and pedestal 22. The flat springs 31 are disposed on the plate 29 and extend upwardly at an angle and support the platen 32 on their upper ends while the platen in turn carries the armature 33 disposed within the coil 34 mounted on the plate 29 and it is to be noted that when the coil 34 is energized, the armature 33 will move downwardly therein carrying the plate therewith against the resistance of the flat springs 31 which flex angularly giving the platen an angular movement as the armature 33 moves downwardly into the coil 34 to impart an angular and downward vibratory movement to the platen 32.

The posts 35 are mounted on the plate 29 and extend upwardly through the frame openings 27 and support the hopper at the hopper flange 36 so as to support the hopper 37 independently of the platen 32 so that the hopper 37 is in close position to the platen 32 but in non-touching relationship. The hopper 37 may also be equipped with a reinforcing flange 38 and a cover 39 equipped with a covered loading aperture 40 and a lifting knob 41.

The conveyer portion 23 comprises a traveling belt 42 for moving the containers 43, a switch 44 depressable by the container 43, and a solenoid clamping means 45 for clamping the container 43 in position below the funnel 46. The outer guide rail 47 and the clamp 45 are adjustable relative to the inner rail 48 and the switch 44 to accommodate different sized containers, and the funnel 46 mounted on the shroud 26 and is also adjustable via the collet nut 25 and rod 49 to accommodate different sized containers.

The hopper 37 is equipped with a lower edge portion 50 which is located closely adjacent the platen 32 and is provided with four spaced slots or interruptions 51 through which the powder, granular material, or aggregate flows on to the outer portion of the platen 32 while the platen 32 is equipped with two peripheral openings or slots 52 staggered from the slots 51 necessitating the travel of the granular material on the platen 32 from the slots 51 to the slots 52 to provide area for obtaining a level layer of material on the platen 32 at the platen slots 52 which are formed in the peripheral rim 53 of the platen 32. The platen outlet slots may be formed in the rim 53 only as illustrated in Fig. 9; or in the rim 53A and in the platen slots 52A as illustrated by the slot 52A; or in the rim 53B only with a leading and retreating edges formed in the rim 53B as illustrated by the slot 52B; or the rim 53C may be turned inwardly as at 54 to provide a leading edge and thereby form the slot 52C. It is also obvious that any type slot may be formed by combining the elements shown in Fig. 9. Any suitable type electrical apparatus and power may be used to activate the coil 34 and the power is fed through the control panel 60 and which is equipped with a vibration amplitude adjusting rheostat 61 for adjusting the force or amplitude of the vibrations and is also equipped with a timer which includes a large time adjustment 62 and a fine vernier adjustment 63 for accurately measuring the time during which the vibrations occur.

The platen 32 has a central crowned portion 70 sloping downwardly and outwardly from the center point 71 and it has been found that a slope of 8° is suitable. The step 72 drops the platen surface surrounding the center and forms the ring portion 73 and the step 74 again drops the platen surface and forms the area 75.

After determining the amount of material to be dispensed, the proper size vial or container 43 is selected and the conveyer rail 47, clamp 45, and the funnel 46 are adjusted to suit the size of the container whereupon filling the hopper 37 with the desired material the device is ready to operate.

In operation the amount of material needed to be dispensed is determined by the vibration amplitude and the period of time during which it occurs and so that by a few trials and adjustments of the vibration amplitude and the time period set by the timer 62 and 63, the exact amount of material desired is vibrated through the slot 52 during the time interval.

After the hopper has been filled with the material and the time and interval determined in conjunction with the amplitude of the vibration, the conveyer belts 42 are started so as to travel the containers 43 thereon.

Upon the container contacting the roller 80 on the arm 81 of the switch 44, the power is connected to the coil 34 to pulse the coil 34 to produce an intermittent field around the armature 33 drawing the armature 33 downward at rapid intervals to vibrate the platen 32 as carried by the springs 31 so that the granular material in the hopper 37 finds its support suddenly dropped from therebeneath and suddenly rising up at a counterclockwise angle so as to impel the granular material in a counterclockwise movement as indicated by the arrows 90. As the granular material moves outwardly on the platen radially as urged by the crowned surface it also moves angularly and the combined radial and angular movement results in a spiral movement of the material on the platen 32. The material moves over the steps 72 and 74 onto the areas 73 and 75 and is confined on the platen by the peripheral rim 53 as it travels counterclockwise thereabout. Due to the spiral movement of the material on the platen and the even feeding thereof to the platen via the slots 51, the granular material forms an even layer over the step or area 75 so that as it moves angularly of the platen in a counterclockwise direction, an even layer of material travels past the slots 52 in the platen rim 53 over the funnel portion 46 so that an even layer of material travels outwardly of the platen through the slot 52 into the funnel 46 and into the container 43.

When the container 43 contacts the roller 80 so as to close the switch 44 the solenoid clamp 45 is supplied with energy so as to thrust the armature 91 toward the container 43 so that the clamp portion 92 engages the container 43 and holds the container 43 opposite the roller 80 until the time interval as set by the timer 62 and 63 transpires during which the vibrations occur and the container is loaded. Upon the time expiring the current cuts off deactivating the clamp 45 so as to permit the continuously running conveyer 42 to travel filled container 43 and advance the next empty container 43 into position against the roller 80 whereupon the electrical system is again energized and the winged clamp 92 is again forced to hold the empty container 43 against the roller 80 so as to complete the circuit in the electrical system to have the vibrations occur during the time interval set so as to load the container. The operation automatically progresses until the desired number of containers are filled with the desired amount of aggregate and it has been found that the amount of material loaded into the vials is extremely accurate so that the device accurately loads each vial with the desired amount of power or aggregate.

A suitable electric circuit furnishes power to the coil 34 via the rheostat 61, timer 62, and timer 63 and to solenoid coil 45; the switch 44 is adapted to close the circuit to both coils 34 and 45 to initiate timing and vibration; the timers 62 and 63 are adapted to break the circuit to stop vibration and to release clamp 92 by de-energizing the coils 34 and 45. The conveyer belts 42 are separately powered and run continuously.

Although but a single embodiment of the invention has been shown and described in detail it is obvious that many changes may be made in the size, shape, detail, and arrangements of the various elements of the invention within the scope of the appended claims.

I claim:

1. A device for measuring and dispensing accurate amounts of aggregate such as dry powder comprising an annular platen, having a crowned central portion, means for axially and angularly vibrating said platen for spirally traveling aggregate thereon, and an upstanding peripheral rim on said platen having at least one aggregate escape slot, a circuit powering said vibrating means, a normally open first switch in said circuit for closing said circuit to initiate vibration, and a timer operated normally closed second switch in said circuit for opening said circuit to terminate vibration; said first switch being adapted to be closed when a container is properly located to receive the aggregate from said platen and said second switch being adapted to be opened after a time duration measured by said timer co-ordinated with the adjusted amplitude of vibration of said vibrating means so as to deliver a measured amount of aggregate to a container.

2. A device for measuring and dispensing accurate amounts of aggregate such as dry powder comprising an annular platen, a hopper for feeding aggregate on said platen centrally thereof, means for axially and angularly vibrating said platen for spirally traveling aggregate thereon, an upstanding peripheral rim on said platen for containing aggregate thereon; said rim having at least one escape slot therein for permitting aggregate to escape therethrough; said platen being capable of traveling an even layer of aggregate through said rim slot; timing means for determining the time duration of vibration so that by co-ordinating amplitude of vibration with time period of vibration a certain amount of aggregate travels through said rim slot, a circuit powering said vibrating means, a normally open first switch in said circuit for closing said circuit to initiate vibration, and a timer operated normally closed second switch in said circuit for opening said circuit to terminate vibration; said first switch being adapted to be closed when a container is properly located to receive the aggregate from said platen and said second switch being adapted to be opened after a time duration measured by said timer co-ordinated with the adjusted amplitude of vibration of said vibrating means so as to deliver a measured amount of aggregate to a container.

3. In a device as set forth in claim 2, said platen having a crowned portion to assist radial travel of aggregate thereon in conjunction with vibration.

4. In a device as set forth in claim 2, said platen having at least one concentric step and ring area adjacent its periphery to provide a leveling area for aggregate.

5. In a device as set forth in claim 2, electrically operated clamping means adapted to secure a container below said platen rim slot so that aggregate flowing therefrom is received by said container.

6. In a device as set forth in claim 2, a funnel disposed below said platen rim slot for receiving aggregate flowing therefrom and channeling same to a container, and adjustable support means holding said funnel capable of positioning said funnel relative to different size containers.

7. In a device as set forth in claim 2, a frame, a pedestal on said frame adapted to be raised and lowered relative to said frame, at least one plate on said pedestal, springs on said plate supporting said platen, a coil on said plate, an armature on said platen disposed within said coil; said springs, armature and coil being adapted to axially and angularly vibrate said platen; posts on said plate adapted to support said hopper over said platen in close spaced relation thereto; a conveyor on said frame; said pedestal being capable of raising and lowering said plate and associated parts relative to conveyor to accommodate different sized containers.

8. In a device as set forth in claim 7, said conveyer comprising a fixed inner rail, an adjustable outer rail, and a surface for traveling conveyers between said rails; said adjustable outer rail being movable toward and away from said fixed rail for accommodating different size containers; a switch in said circuit adjacent said inner rail on said frame, an arm on said switch extending through said inner rail so that a container traveling between said rails moves said arm to activate said switch to close said circuit when said container is below said platen rim slot to power said coil to vibrate said platen via said armature to cause aggregate to flow into said container as limited by said timing means.

9. In a device as set forth in claim 8, a solenoid clamp on said adjustable rail included in said circuit adapted to be powered when said switch is closed to clamp a container below said platen rim slot and against said switch arm to prevent said container traveling beyond said slot and switch.

10. An accurate aggregate measuring and dispensing device comprising an annular axially and angularly vibrated platen adapted to receive aggregate axially and travel the aggregate radially and angularly; a crowned central portion on said platen adapted to assist traveling aggregate to spiral outwardly of said platen in conjunction with centrifugal force, an annular area stepped below said crowned area surrounding said crowned portion constituting an aggregate leveling area adapted to receive aggregate from the crowned area and to angularly travel the aggregate in a level strip, a peripheral rim surrounding said platen adapted to confine aggregate in said leveling area, at least one aperture outlet in said rim adapted to strip off a vertical section of said traveling leveled aggregate, means for varying the amplitude of vibration of said platen for varying the speed of movement of aggregate, and means for timing the duration of vibration in relationship to the aggregate speed so that accurate quantitative flow of aggregate is obtained by co-ordinating vibration amplitude and during timing.

11. In a device as set forth in claim 10 a conveyor for containers and a switch operated clamp constituting means for moving and holding a container into aggregate receiving position and for activating said vibration and timing means.

12. An accurate aggregate measuring and dispensing device comprising an annular axially and angularly vibrated platen adapted to receive aggregate axially and travel the aggregate radially and angularly; a crowned central portion on said platen adapted to assist radially and angularly traveling aggregate to spiral outwardly of said platen; an annular area stepped below said crowned area surrounding said crowned portion constituting an aggregate leveling area adapted to receive aggregate from the crowned area and to angularly travel the aggregate in a level strip, a peripheral rim surrounding said platen adapted to confine aggregate in said leveling area, and at least one aperture outlet in said rim adapted to receive vertical section of said traveling leveled aggregate, means for varying the amplitude of vibration of said platen for changing the speed of movement of aggregate, and means for timing the duration of vibration in relationship to the aggregate speed of movement so that accurate quantitative flow of aggregate is obtained by co-ordinating vibration amplitude and duration timing.

13. In a device as set forth in claim 12 an intermittently moving and stopped train of containers constituting means for positioning containers below said platen rim slot and activating said vibration and timing means to dispense a certain quantity of aggregate into a container.

14. An accurate aggregate measuring device comprising a vibrator mechanism, an annular platen adapted to be vibrated by said mechanism to cause aggregate thereon to travel, a flat outer annular leveling area on said platen portion stepped below the center plate of said platen adapted to accummulate an even layer of aggregate, and a confining peripheral rim surrounding said leveling area having at least one opening adapted to strip off a portion of the leveled layer of aggregate as it travels around said leveling area adjacent said rim.

References Cited in the file of this patent
UNITED STATES PATENTS

| | | |
|---|---|---|
| 767,591 | Nickerson | Aug. 16, 1904 |
| 2,095,283 | Peale | Oct. 12, 1937 |